(12) United States Patent
Luft et al.

(10) Patent No.: US 11,096,049 B2
(45) Date of Patent: Aug. 17, 2021

(54) CONNECTION OF WEARABLE DEVICES

(71) Applicant: IPCom GmbH & Co. KG, Pullach (DE)

(72) Inventors: Achim Luft, Braunschweig (DE); Martin Hans, Bad Salzdetfurth (DE)

(73) Assignee: IPCOM GMBH & CO. KG, Pullach (DE)

( * ) Notice: Subject to any disclaimer, the term of this patent is extended or adjusted under 35 U.S.C. 154(b) by 0 days.

(21) Appl. No.: 16/319,996

(22) PCT Filed: Jul. 26, 2017

(86) PCT No.: PCT/EP2017/068884
§ 371 (c)(1),
(2) Date: Jan. 23, 2019

(87) PCT Pub. No.: WO2018/019883
PCT Pub. Date: Feb. 1, 2018

(65) Prior Publication Data
US 2019/0274110 A1    Sep. 5, 2019

(30) Foreign Application Priority Data
Jul. 26, 2016  (EP) ..................................... 16181302

(51) Int. Cl.
*H04W 12/06* (2021.01)
*H04W 76/25* (2018.01)
(Continued)

(52) U.S. Cl.
CPC ......... *H04W 12/06* (2013.01); *H04L 63/0884* (2013.01); *H04W 4/80* (2018.02);
(Continued)

(58) Field of Classification Search
CPC ..... H04W 60/06; H04W 76/25; H04W 76/15; H04W 4/80; H04W 76/11; H04W 8/04;
(Continued)

(56) References Cited

U.S. PATENT DOCUMENTS

2012/0238208 A1    9/2012  Bienas et al.
2014/0169285 A1    6/2014  Sagfors et al.
(Continued)

FOREIGN PATENT DOCUMENTS

WO   WO-2012035335 A1   3/2012

OTHER PUBLICATIONS

International Search Report for International Application No. PCT/EP2017/068884, dated Nov. 7, 2017.
(Continued)

*Primary Examiner* — Obaidul Huq
(74) *Attorney, Agent, or Firm* — Marshall, Gerstein & Borun LLP (57) ABSTRACT

The present invention provides a method for enabling a wearable device connected to a user equipment device to be identified and authenticated within a mobile communications network, the method comprising attaching both the user equipment device and the wearable device to the mobile communications network by means of a single registration request communicated by the user equipment device to the mobile communications network.

11 Claims, 5 Drawing Sheets

(51) Int. Cl.
*H04W 4/80* (2018.01)
*H04W 76/11* (2018.01)
*H04L 29/06* (2006.01)
*H04W 8/04* (2009.01)
*H04W 8/08* (2009.01)
*H04W 8/20* (2009.01)
*H04W 60/06* (2009.01)
*H04W 88/04* (2009.01)
*H04W 68/02* (2009.01)
*H04W 76/15* (2018.01)

(52) U.S. Cl.
CPC .............. *H04W 8/04* (2013.01); *H04W 8/08* (2013.01); *H04W 8/20* (2013.01); *H04W 60/06* (2013.01); *H04W 68/02* (2013.01); *H04W 76/11* (2018.02); *H04W 76/15* (2018.02); *H04W 76/25* (2018.02); *H04W 88/04* (2013.01)

(58) Field of Classification Search
CPC ......... H04W 8/08; H04W 8/20; H04W 12/06; H04W 68/02; H04W 88/04; H04L 63/0884
USPC ........................................ 370/310, 328, 329
See application file for complete search history.

(56) References Cited

U.S. PATENT DOCUMENTS

| | | |
|---|---|---|
| 2014/0198714 A1 | 7/2014 | M |
| 2014/0269283 A1 | 9/2014 | Shaheen |
| 2015/0229639 A1 | 8/2015 | Abdulrahiman et al. |
| 2015/0334554 A1 | 11/2015 | Song et al. |
| 2016/0021635 A1 | 1/2016 | Lee et al. |
| 2016/0127331 A1* | 5/2016 | Liu ........................ H04B 1/385 713/171 |
| 2016/0227410 A1* | 8/2016 | Narasimha ............ H04W 12/08 |
| 2018/0255451 A1* | 9/2018 | Fan ........................ H04W 12/08 |

OTHER PUBLICATIONS

3rd Generation Partnership Project; Technical Specification Group Services and System Aspects; Study on Facilitating Machine to Machine Communication in 3GPP Systems; (Release 8), 3GPP Standard; 3GPP TR 22.868., 3rd Generation Partnership Project (3GPP), Mobile Competence Centre; pp. 1-15, XP050361381, Mar. 1, 2007.

European Patent Office Examination Report for Application No. EP 17 742 447.0, dated Feb. 15, 2021.

* cited by examiner

CONNECTION OF WEARABLE DEVICES

CROSS-REFERENCE TO RELATED APPLICATIONS

This is the United States national phase of International Patent Application No. PCT/EP2017/068884, filed Jul. 26, 2017, which claims the priority benefit of European Application No. 16181302.7, filed on Jul. 26, 2016. The entire contents of each of the foregoing are incorporated herein by reference.

FIELD OF THE DISCLOSURE

The present invention relates to wearable communication devices and in particular a communication protocol for their operation within a mobile communications network.

BACKGROUND

The popularity of wearable communication devices like smart watches or fitness-trackers has increased dramatically during the last years and expectations of future demand are even higher. In most cases wearable devices are frequently using wireless data communication e.g. with the internet, in order to present information like weather forecasts, information about the surrounding or personal communication like email or instant messaging to the wearer. Most services are combined with social networks and the very essence of these services is connecting users with each other. On the other hand, the wearable devices become smaller as size is a crucial factor for the user experience of wearable devices. Most users of wearable devices also carry a powerful communication device such as a smartphone almost at any time of the day. Therefore, a typical wearable communication device scenario is that a wearable communication device is connected via short range communication radio technology such as Bluetooth to a smartphone that acts as a gateway for the wearable device to the internet Benefits of this scenario are, that there is no need to implement complex cellular radio technology such as LTE into a small wearable device. Especially the use of low power Bluetooth is extending the battery life time of wearable devices far beyond a scenario in which the wearable device has to implement a complex and power consuming cellular radio technology.

US 2015/334554 A1 describes a method of using subscriber identification information stored in mobile user equipment (UE) to connect to a communication service over a public wireless network in the UE, establishing a communication link between the UE and a device, generating network access information (NAI) associated with the communication service in the UE, and sending the NAI from the UE to the device via the communication link. The method comprises connecting the communication service in the device using the NAI and terminating the connection of the communication service in the UE.

US 2015/229639 A1 describes methods that allow credentials of a first client station to authenticate a second client station. The method includes associating a first client station with a second client station, the first client station including credential information, the associating authorizing the second client station to use the credential information, transmitting, by the second client station, an association request to a network, the network utilizing the credential information to authorize a connection, the second client station configured to perform a proxy functionality for requests received from the network to be forwarded to the first client station and responses received from the first client station to be forwarded to the network, determining, by the network, whether the credential information received from the second client station is authenticated and establishing a connection between the second client station and the network using the credential information of the first client station.

US 2012/0238208 A1 describes a mobile radio communication device including a short range radio transceiver. The device may form an opportunistic network, where a relaying device may be connected to a cellular radio communication system. The relaying device may provide access to the cellular radio communication system for another device using short range wireless communication technology. The other mobile radio communication device may be informed of incoming data from the cellular radio communication system via short range communication from the relaying radio communication device.

US 2016/0021635 A1 describes a mechanism for connecting a device such as a parking meter via a UE with a communication link with the UE being established using, for example, an NFC link, Bluetooth or WLAN. The device to be connected may or may not include its own SIM circuit.

US 2014/0169285 A1 describes an aggregating device connected to a base station with the aggregating device forming a connection to one or more other devices whereby the connected device is provided with a global identity.

WO 2012/035335 A1 describes a further example of the connection of devices to a network using a UE as an intermediary with the network HLR maintaining multiple records or linking a single IMEI to multiple devices.

Within existing mobile communication systems, a concept referred to as a "non-access stratum" (NAS) is employed. The NAS forms the highest stratum of the control plane protocol stack of the radio interface between UE and a network entity, e.g. the MME for LTE.

Main functions of the protocols that are part of the NAS are the support of mobility of the terminal GUTI (Global Unique Temporary ID) reallocation, authentication, security mode control, identification and mobility management information exchange; the support of session management procedures to establish and maintain IP connectivity between the terminal and a packet data network (PDN, e.g. the internet) via a gateway (PDN-GW) at the edge of the operator network, providing connection management and session management. In connection management, a service request may be initiated by the UE to start the establishment of NAS signaling connection. A paging message may be initiated by the network in case of downlink NAS signaling to indicate to the UE to start a service request. NAS messages may be transported, for example SMS messages together with the generic transport of NAS messages for various other applications such as location based services.

In session management, there are bearer procedures, which are network-initiated and provide mechanisms for activation, deactivation or modification of bearers and transaction-related procedures, which are terminal-initiated and provide mechanisms for requests for PDN connection establishment and disconnection, requests for bearer resources allocation and modification and release requests.

NAS security is an additional function of the NAS providing services to the NAS protocols, e.g. integrity protection and ciphering of NAS signaling messages. From a protocol stack perspective, the NAS is the highest stratum of the control plane, at the UE sitting above the RRC layer and at the MME above the S1-AP layer in an enhanced packet system control plane for E-UTRAN access.

During the network attach procedure, the network can activate a default bearer context (i.e. if the terminal requests IP connectivity in the attach request). Additionally, the network can activate one or several dedicated bearer contexts in parallel for several IP connections or different quality of service (QoS) settings.

The security parameters for authentication, integrity protection and ciphering are tied together in a security context and identified by a key set identifier (eKSI). Before security can be activated, the MME and the terminal (User Equipment/UE) need to establish a security context. Usually, the security context is created as the result of an authentication procedure between MME and UE.

The use of ciphering in a network is an operator option subject to MME configuration.

From a network operator's perspective wearable communication devices such as smart watches, which use a smartphone as gateway into a cellular network, are practically invisible. Only the smartphone including the user's subscription (SIM/Subscriber Identification Module) is visible to the operator. Therefore, cellular network operators are lacking the opportunity to offer business relationships dedicated to customers with wearable devices. Also, it is not possible for an operator to optimize the cellular network for devices "hidden" behind a smartphone.

GENERAL DESCRIPTION

For the development of wearable devices, the size of the device and the lifetime of the battery are two important criteria. Including a smart card (UICC) and a cellular radio into a wearable device will not meet user's expectation of the battery lifetime. Currently most wearable devices are connected via Bluetooth (low energy profile or Bluetooth SMART or Bluetooth 4.x all with a reduced radio range up to 10 meters) with other devices like smartphones. While these Bluetooth protocols consume several times less energy than cellular radio communication, most batteries of wearable devices have to be recharged every second day. With higher power consumption the device vendor has to implement larger batteries in order to deliver the same battery lifetime. Also a removable UICC with its mechanical socket would increase the size of the wearable device. Both are in contradiction to user's demand for very tiny wearable devices. Recently, mobile devices incorporating an embedded SIM, or eSIM, have become available, avoiding the need for a physical chip card.

The present invention provides a method for enabling a wearable device connected to a user equipment device to be identified and authenticated within a mobile communications network, the method comprising attaching both the user equipment device and the wearable device to the mobile communications network by means of a single registration request communicated by the user equipment device to the mobile communications network. Corresponding network entities and user equipment devices are also provided.

A wearable device in the sense of the present invention is not restricted to any device that can be worn in a specific manner only. Currently, smart watches, smart glasses and smart jewelry like rings and necklaces are often named wearable devices. However, the present invention includes a broader definition of wearable devices including devices within or attached to the human or animal's body, or on the skin. It includes all devices that are part of clothing, headdress, footwear, gloves or bags, umbrellas and other items carried around. Wearable devices can have a user interface with a purpose to inform a user extensively, like smart watches, and/or allow human-to-device interaction. A wearable can also have the sole purpose to sense one or more environmental parameter(s), e.g. sensors for vital functions like heartbeat, blood pressure or environmental sensors like audio, video, light, temperature, or humidity sensors. The term wearable device in this invention is thus a synonym for any device that has any of the mentioned restrictions in size, power, or other that let the device benefit from communicating with a mobile network in the way described herein.

It is an object of the present invention to allow wearable devices to be identified and authenticated by the operator network without the need to implement the device to a full cellular mobile.

This is achieved by enhancing the communication and configuration between a UE and the cellular core network so that multiple devices connected with the UE, e.g. wearable devices, can be identified and authenticate by the core network.

The enhancements are kept to a minimum, i.e. not implementing cellular protocol stack entities in the connected devices or additional entities in the UE.

According to known arrangements, the actual identification of a subscription a device is bound to is done by the USIM. This principle may be applied in the present invention. However, the USIM may be present either in the wearable device itself (unlikely as a SIM card/UICC; more likely embedded) or in the UE as multiple SIM cards, multiple USIMs (USIM Applications) on one SIM card, the wearable device subscription is derived from the user's subscription or one USIM has multiple profiles.

In one aspect, the invention provides a solution to the general problem of identifying a wearable device that does not have a cellular air interface implemented from a cellular network.

The invention provides attachment related functions to allow serving multiple devices even though the main architecture may be unchanged over existing systems, i.e. each function and each protocol stack layer exists once in the UE and once in the core network.

For authentication it is assumed that each device is bundled with one subscription and each subscription is identified by a single USIM on the UE side and a single data base entry in the Home Subscriber Station (HSS) on the network side.

The authentication procedure is performed during a UE attaching to the network. The authentication procedure may be repeated on network request while the UE is attached; e.g. as error case handling. An attached UE is thus authenticated and has a core network entity associated, in LTE the entity is called the MME (Mobility Management Entity). The MME has a context for the UE with certain information relevant for security, service setup etc. An attach function may fail due to improper authentication which results in a UE not being served by the network (with exception of emergency calls).

In order to authenticate multiple connected devices, the UE has to perform multiple attach procedures which each may fall. In contrast to attaching the UE itself, the failure of attaching connecting devices will not lead to the UE detaching or not being served. Also other connected devices may be successfully attached while a single connected device is not served.

Therefore, this invention in one aspect provides an adapted attach procedure, a "secondary attach", that serves connected devices. The failure of the secondary attach procedure or a later detach of a connected device (secondary detach) will not result in the network to release the UE connection unless it goes in parallel to the UE detach.

Due to the nature of the secondary attach procedure, it may be beneficial to also install implicit trigger mechanisms on the network as well as on the UE side so that status updates for the UE will result in an update for respective secondary attached devices without the need for further communication over the air. A handover or cell re-selection by the UE that leads to a change of the serving core network entity (MME) will result in an update of the respective information in the HSS for the attached UE as well as for all secondary attached devices. Detachment of the UE will result also in detachment of all secondary attached devices.

Through the present invention, the wearable device becomes addressable, chargeable (billable) and servable by the cellular network. The operator is able to identify the wearable device in the network, optimize the network (e.g. with network slicing) for wearable devices and offer users of wearable devices dedicated business models. No cellular radio access technology is required to be implemented in the wearable device, providing extended battery lifetime and a compact design of wearable device.

BRIEF DESCRIPTION OF THE DRAWINGS

Embodiments of the invention will now be described, by way of example only, with reference to the accompanying drawings in which.

DETAILED DESCRIPTION

Figure 1:
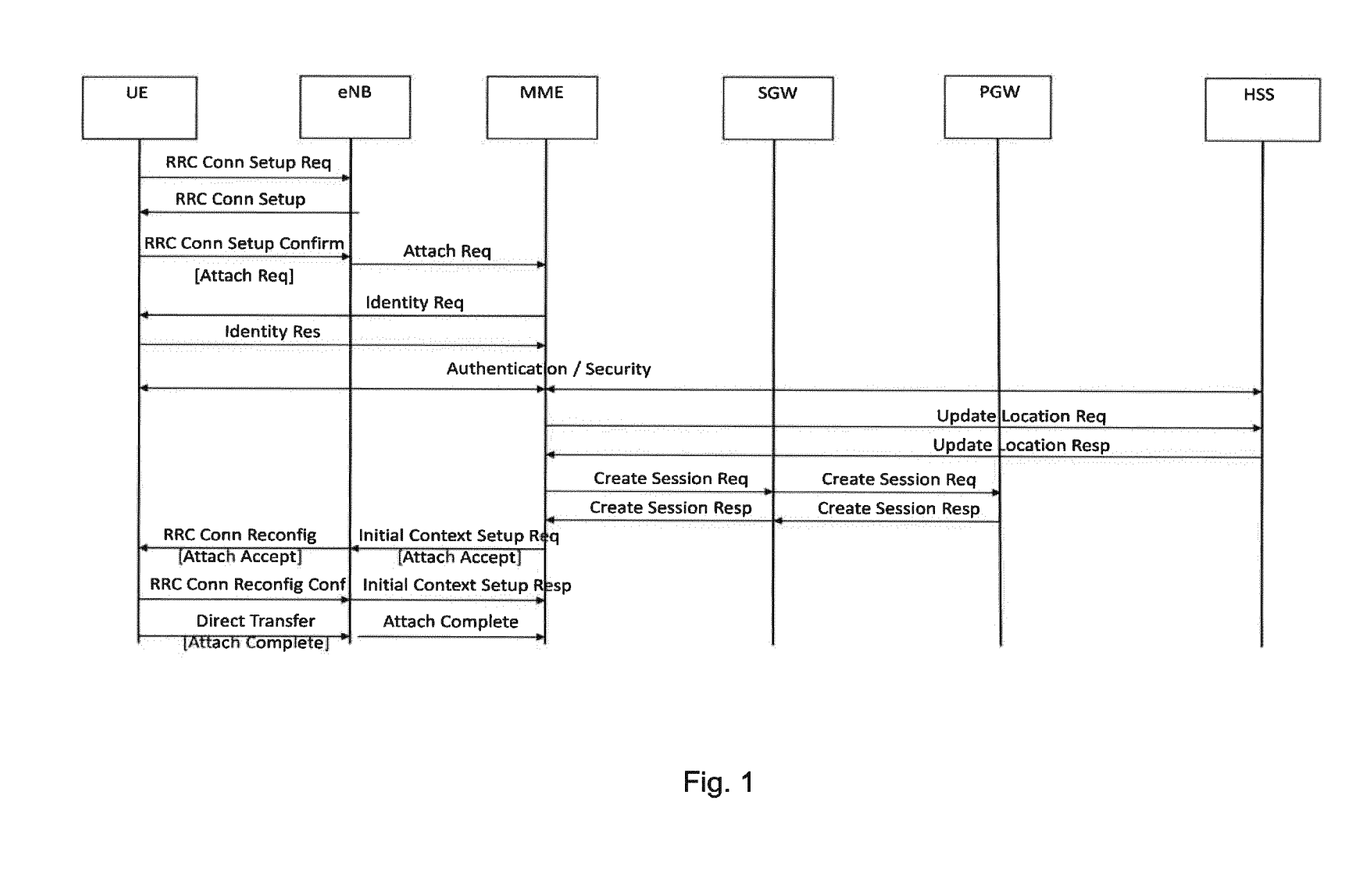
FIG. 1 is a message sequence chart for attaching a user equipment to a mobile network.

Referring to FIG. 1, there is shown a message sequence chart of a known attach procedure according to 3GPP TS 23.401.

As shown, the procedure has the following elements.

A UE sends an Attach Request message as part of a RRC Connection Setup Confirm message that confirms the setup of a connection between UE and eNB. An information element Attach Type is set to "EPS Attach" for normal service or "EPS Emergency Attach" for emergency services. The UE changes its state from EMM-DEREGISTERED in EMM-REGISTERED-INITIATED. The UE uses one of its available identities in the message. For PLMNs where the UE has not registered before, this may be the IMSI, otherwise it is one of the temporary identities; e.g. GUTI (Globally Unique Temporary ID). The UE may send its capabilities and request parameters. These may be related to DRX, SRVCC, or Proximity Services (ProSe). The UE may request setup of a default EPS bearer with a session management message within the same container transported in the RRC message. Further bearers may also be requested.

After selection of an appropriate MME by the eNB, the Attach Request message is forwarded to the MME.

If the identity of the UE is not properly known in the MME, e.g. the UE uses a temporary identifier (in LTE the MME-TMSI as part of the GUTI) which is not known to the MME, the MME may use an Identity Request to receive the IMSI of the UE in an Identity Response.

An authentication procedure is performed between UE, MME and the subscriber database (HSS) that authenticates the UE utilizing the UE's USIM and which establishes security means (ciphering and integrity protection keys).

The subscriber entry in the HSS is updated to reflect the reachability of the UE via the selected MME.

If a default bearer was requested by the UE, the S-GW and P-GW are prepared in order to provide the bearer. Further bearers may be established as part of the procedure or at a later stage.

The eNB is setup to serve the UE with security enabled and providing the respective bearer service in an Initial Context Setup Request message that contains the Attach Accept answer of the MME. The message contains a Tracking Area Identification List with the tracking areas the UE is now registered in. The message may contain a new temporary identifier of the UE, especially when the UE used the IMSI in the Attach Request. The new identifier is stored for later usage.

The context and bearers are setup and finally an Attach Complete message confirms the terminated Attach Procedure. The UE changes to EMM-REGISTERED state.

The attach procedure may also fail due to various reasons. In that case, the MME transmits an Attach Reject Message (not shown) to the UE with a reason code in order to provide the cause of the rejection. The rejection causes currently defined include the following: illegal UE or illegal ME, EPS services not allowed or EPS services and non-EPS services not allowed, PLMN not allowed or Requested service option not authorized in this PLMN, tracking area not allowed, roaming not allowed in this tracking area and congestion.

Depending on the cause value provided, the UE will take actions to prevent or delay future attachments in the same network. Some of the potential actions are: the UE deletes the stored temporary identities it was allocated by the network, the UE deletes all tracking areas (TA) and TA lists stored from the network, the UE may consider the USIM to be invalid until the UE is switched off or the UICC containing the USIM is removed or the UE changes its state to EMM-DEREGISTERED.

Figure 2:
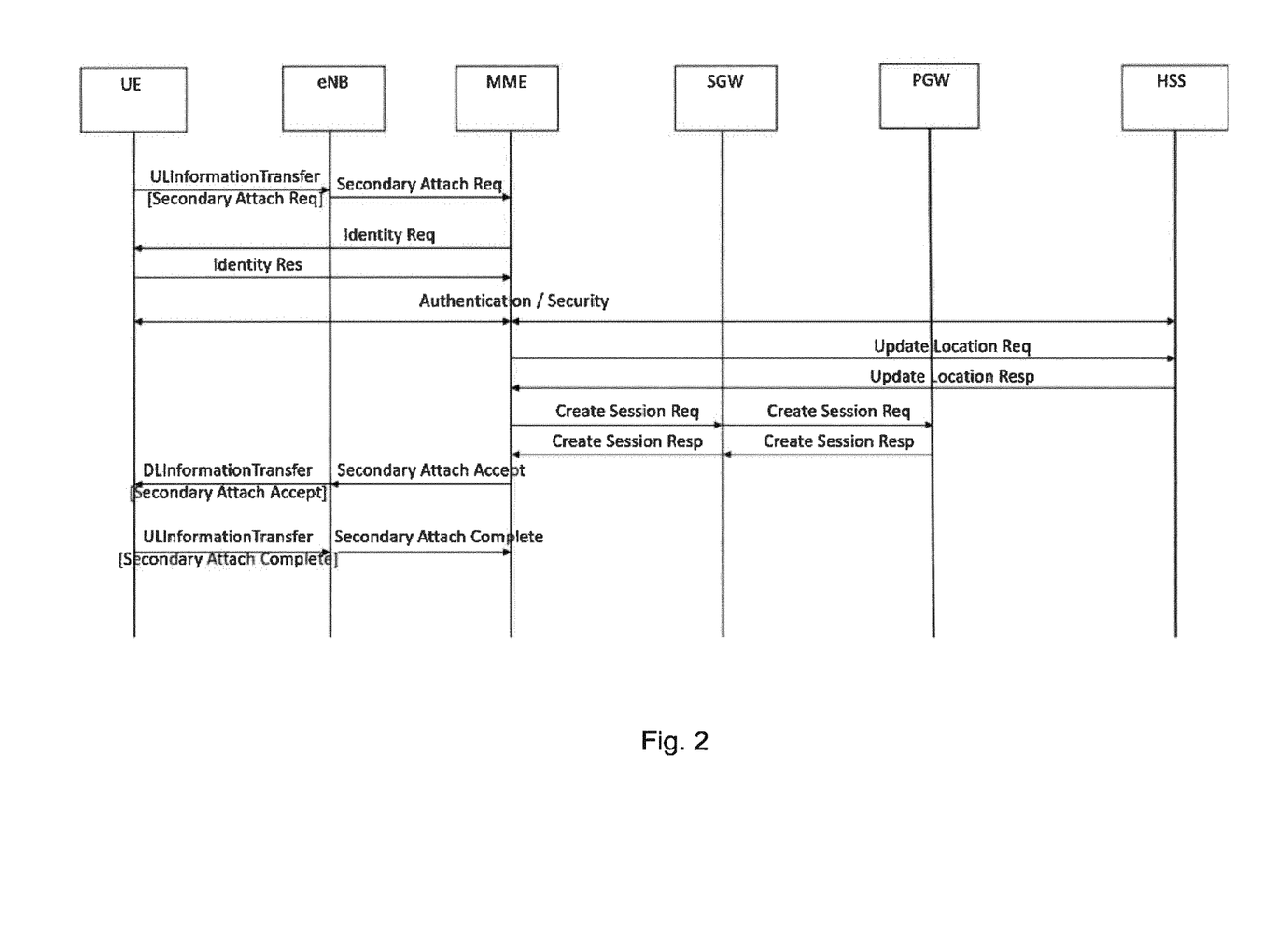
FIG. 2 is a message sequence chart for attaching a wearable device to the mobile network of FIG. 1.

Referring now to FIG. 2, there is shown a message sequence chart of a secondary attach procedure according to the invention which bears a degree of similarity to the chart of FIG. 1. The message sequence of FIG. 2 starts from a registered UE that already has a context in the MME. The UE may be in connected mode, so that it can immediately send data to the base station, or it may be idle and needs to establish an RRC connection to send data. If the UE is not RRC connected and needs to secondary register a connected device, it will use the RRC Connection setup procedure.

An MME serving the UE is defined, a context exists and security is established between MME and UE. For the secondary attach procedure, the following steps apply:

The UE sends a Secondary Attach Request, either in an RRC UL Information Transfer message or as part of an RRC Connection setup. The information element Attach Type may be enhanced to indicated "EPS Secondary Attach" for normal service. This may be especially useful when the inventive secondary attach procedure is performed using the legacy Attach Request/Accept/Complete Messages without defining a set of new messages for secondary attach. The UE EMM-State of the UE will not change, but the UE has to store the fact, that an Attach Request has been sent for the new device and an answer to that request is pending which is identical to having a EMM-state for the connected device.

The UE uses one of the connected device's identities in the message. For PLMNs where the device had not been registered before, this may be the IMSI, otherwise it is a temporary identity which may have been stored in the UE or the device itself (or it may be stored on the respective device's USIM). In addition, the UE may provide its own identity (MME-TMSI) to the MME to indicate which UE is communicating the Attach Request on behalf of the connected device. This information may also be implicitly known by the MME due to the communication connection the NAS messages take, i.e. the eNB may signal the communication coming from the specific UE. The UE may send in the Secondary Attach Request the connected devices capabilities as far as they do not relate to a function that is carried out by the UE, i.e. DRX and other transport mechanisms are out of scope of the connected device. The UE may request setup of a default EPS bearer for the connected device with a session management message within the same container transported in the RRC message. Further bearers may also be requested.

The message is forwarded to the same MME that serves the UE.

The MME checks whether the identity provided in the message is allocated to a connected device and requests the IMSI of the connected device from the UE if it is not.

The UE, MME and HSS authenticate the connected device using the USIM of the connected device on the UE side. Security, however, may not be changed as the UE already has a secure connection to the MME.

After successful authentication, the HSS entry of the subscriber is updated to reflect the reachability of the connected device via the MME. Alternatively, the HSS may be updated to reflect reachability to be identical with that of the UE. With this, the HSS will update the connected device's entry autonomously once the UE's entry is updated regarding its reachability and/or location. Details of this aspect are described further down this document.

A default bearer may be setup involving the S-GW and the P-GW. Alternatively, the default bearer of the UE may be used also as default bearer for connected devices.

Additional bearers may be setup during attach or at a later stage.

The eNB is updated with new bearer information and identities and forwards the Secondary Attach Accept message to the UE.

The attach procedure is terminated with a confirmation from the UE in a Secondary Attach Complete message to the MME.

In case of failure or the secondary attach procedure the consequences will differ from 30 those of the normal attach procedure: the UE will stay attached even after a further attachment of connected devices was rejected and new failure causes may indicate to the UE that secondary devices may not be supported by the network (at that time) so that further attachment procedures are postponed or abandoned.

The above procedures separate the attachment of UE and its connected devices. However, there may be cases in which the remote devices are connected to the UE before the UE attaches to the network. In that case it may be beneficial to perform a combined "primary" and secondary attach. The message flow is similar to the legacy attach procedure:

The UE includes a list of devices to be attached into the attach request.

The MME may fetch additional identity information for each device from the UE as appropriate and authenticate multiple devices, each with a dedicated challenge response mechanism (e.g. in LTE it is AKA) against the respective USIM. As a result of the subsequent key agreement individual session keys are derived for all devices.

The HSS entries of all related devices are updated and may, as described above, either be updated individually with the appropriate location information or the connected devices may reference the UE's entry so that implicit location updates will occur when the UE moves in future.

A failure of the attach procedure of one or more connected devices may lead to the respective device not being reachable by the cellular network while the attachment of the UE may still be successfully completed.

Figure 3:
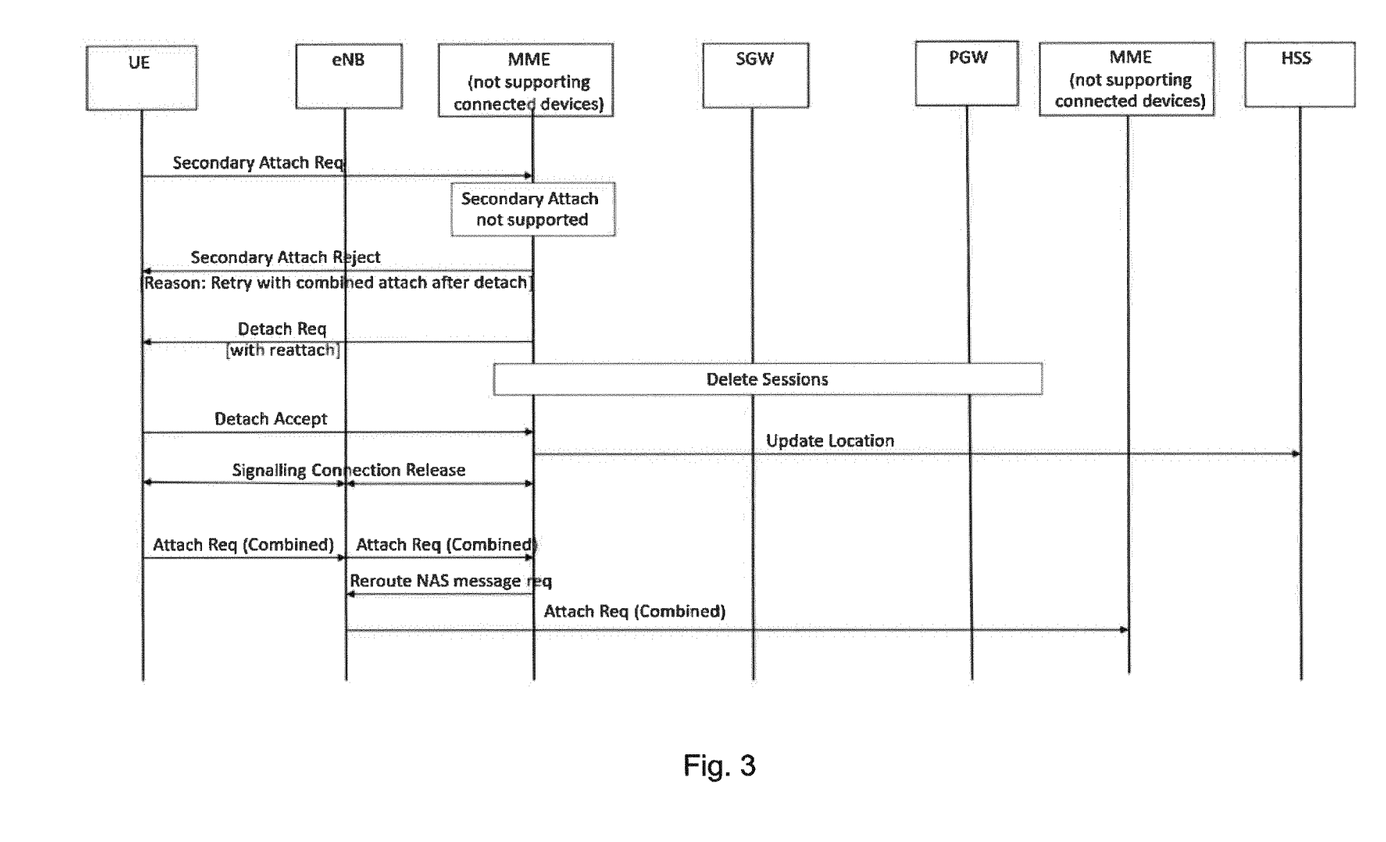
FIG. 3 is a message sequence chart for a situation where a first attachment attempt of the wearable device fails.

New procedures may also be used by the network to handle situations where connected devices cannot be served or attached. One such new procedure is shown in FIG. 3. In case of an attachment attempt of a new connected device by a UE, the network may detect that the MME currently serving the UE is not able to additionally serve connected devices.

The network may initiate a change of the MME to have the UE being served by an MME with remote device supporting ability. The change may be performed initiating an explicit detach procedure by the MME with re-attach required which will trigger the UE after 30 successful detaching to attach again.

To finish the secondary attach procedure properly the MME will reject the request with a reason code that indicates the intention of the network to allow another attach procedure after a new MME was selected or in order to select a new MME.

The later attach may then have to be a combined attach, i.e. an attach procedure for the UE and the connected devices, in order for the network to be able to properly select an MME right away. The "explicit detach with reattach required" procedure is known from 3GPP TS 23.401 § 5.3.8.3 in relation to the "selected IP traffic offload", SIPTO, feature that is not related to the current invention.

A similar function may also be initiated by the UE, so it detaches with the aim to attach again. This could be allowed or enforced by the network through information sent in the Secondary Attach Reject message. The UE will reattach to the network and the network may at that point decide to direct the attach procedure to a different MME that is able to serve the UE and the connected devices. In order for the network to select an appropriate MME, the UE may be forced to request attachment of all devices in a combined message. If the eNB selects an inappropriate MME, e.g. the same as for the last connection, there are means to redirect the selection to another MME as shown in FIG. 3 as an example. The procedure above mainly performs an MME initiated relocation of the serving MME via detach/attach. Alternatively, a handover procedure could move the context between MMEs. The more complex detach/reattach process is used because this relocation function is not foreseen in the current LTE core network. However, in future systems this function may well exist:

The MME after receiving a Secondary Attach message and detecting the MME cannot serve the request may select another MME and forward the UE context it will also inform the eNB about the change of the MME and the new MME will send the Secondary Attach Accept message to the UE.

Figure 4:
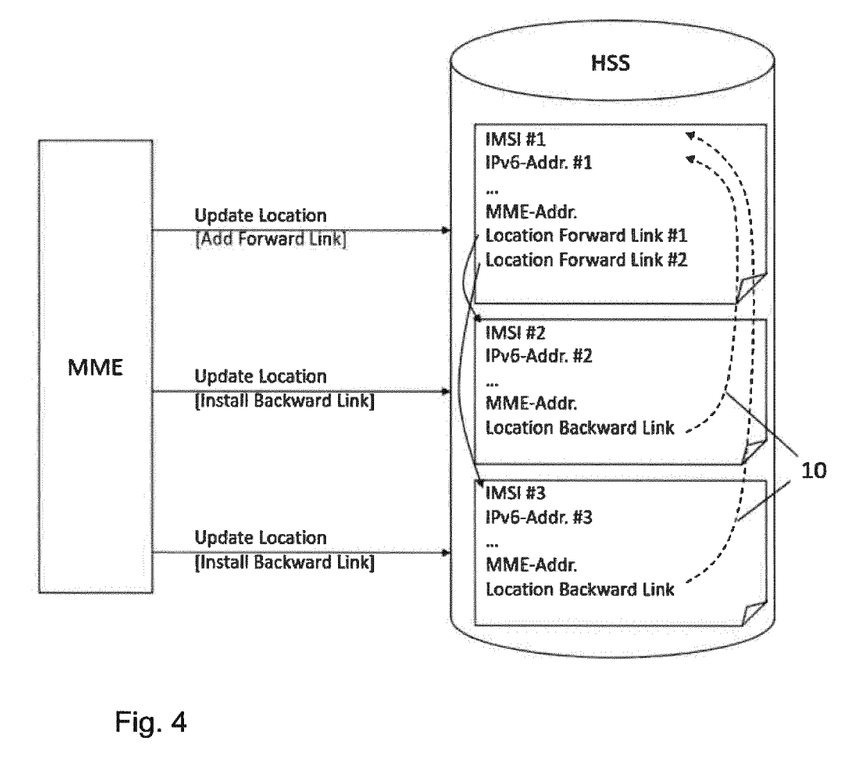
FIG. 4 illustrates an interaction between an MME and an HSS.

FIG. 4 depicts a subscriber data base (in LTE this data base is called Home Subscriber Server/HSS) that is connected example wise to an MME. A full description of the architecture would show a single HSS with a number of MMEs in an operator's network but FIG. 4 is a schematic illustration only of what is described in the following.

It is known for every subscriber is defined by a data base entry in the HSS of his home operator and a related USIM with respective identification and security information. Any successful attach procedure will result in an update in the HSS that updates the location information, i.e. whether and where (tracking area) a UE can be reached.

The present invention allows remote devices connected to the main device (UE) to be attached to the network which leads to a similar location update in the HSS. This principle is described above in detail. The MME informs the HSS about changes of the MME to ensure reachability. This will generate a lot of redundant signalling in the core network as it is clear from the nature of the personal area network that the UE and its connected device span that any update regarding the UE will lead to the same update for all connected devices.

Thus a further aspect of this invention is the linking of subscriber based entries. FIG. 4 shows an MME and an HSS containing three subscriber data base entries with for example the respective IMSI, an IPv6 address (any many more addresses and parameters) stored.

A first successful attach of a connected device (secondary attach) will result in two subscriber data base entry updates: The UE entry is updated to generate a new forward link from the UE entry to the first connected device. The respective entry of the connected device is updated to backward link the entry with that of the UE.

A second successful secondary attach will lead to another update of the UE entry adding another forward link and a backward link set accordingly in the connected device's data base entry.

Curved arrows 10 in FIG. 4 show the links between entry represented in the data base as location forward links and location backward links.

Figure 5:
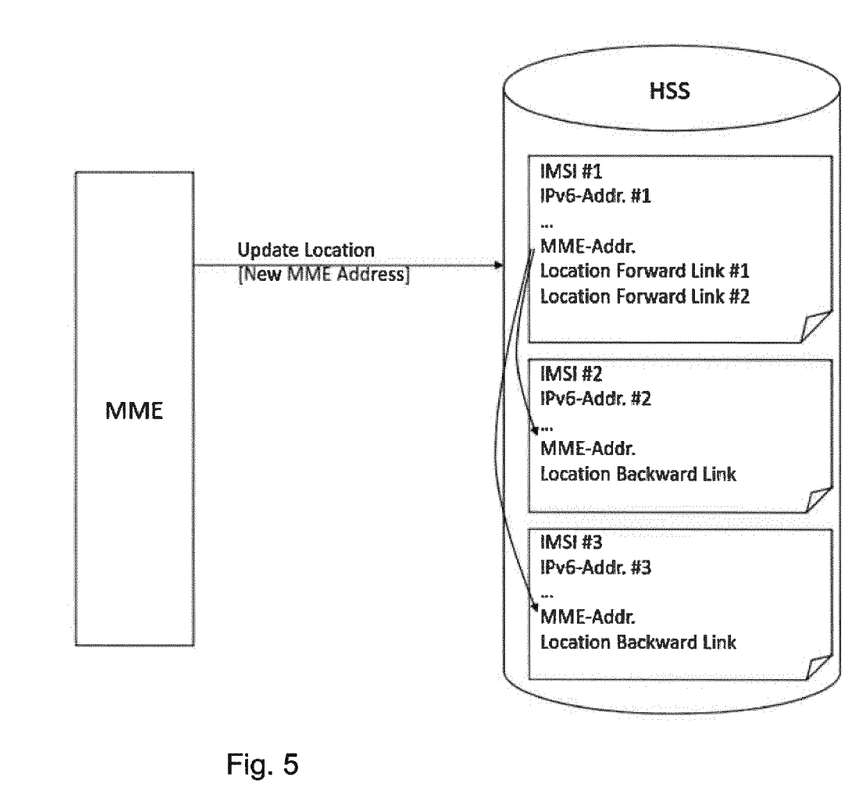
FIG. 5 illustrates an interaction between an MME and an HSS in the event of a handover.

FIG. 5 shows the same setup in the case that due to a handover from one MME to another, for example, the location of the UE is updated in the MME. The forward link entries in the data base will lead to an automatic update of the MME address of the connected device with IMSI #2 and #3 so that these devices are reachable for connection setup or other services.

The invention claimed is:

1. A method for enabling a wearable device connected to a user equipment device to be identified and authenticated within a mobile communications network, the method comprising:
attaching both the user equipment device and the wearable device to the mobile communications network by means of a single registration request communicated by the user equipment device to the mobile communications network, wherein the single registration request comprises an identity of the user equipment device and an identity of the wearable device, and wherein the user equipment device and the wearable device are authenticated within a mobile management entity of the mobile communications network with a dedicated challenge response mechanism against (i) a subscriber identity module of the user equipment device using the identity of the user equipment device, and (ii) a subscriber identity module of the wearable device using the identity of the wearable device.

2. The method according to claim 1, wherein the identity of the user equipment device is one of an international mobile subscriber identity and a temporary identity stored in the user equipment device.

3. The method according to claim 1, wherein the wearable device is connected to the user equipment device by a radio connection.

4. The method according to claim 1, wherein the user equipment device provides information to the mobile communications network about one or more capabilities of the wearable device.

5. The method according to claim 1, wherein the attachment of the wearable device to the mobile communications network may be ended leaving the attachment of the user equipment device to the mobile communications network unaffected.

6. The method according to claim 5, wherein a further wearable device is attached to the mobile communications network by means of communication of the user equipment device with the mobile communications network.

7. The method according to claim 1, wherein the user equipment device remains attached to the mobile communications network in the event of a failure to attach the wearable device.

8. A mobile communications network entity adapted to:
perform an attachment of a user equipment device to a mobile communications network; and
perform an attachment of a wearable device connected to the user equipment device to the mobile communications network, the attachment of the user equipment device and the attachment of the wearable device to the mobile communications network being performed in response to a single attachment request received by the mobile communications network entity from the user equipment device, wherein the single attachment request comprises an identity of the user equipment device and an identity of the wearable device, and wherein the mobile communications network entity authenticates the user equipment device and the wearable device using a dedicated challenge response mechanism against (i) a subscriber identity module of the user equipment device using the identity of the user equipment device, and (ii) a subscriber identity module of the wearable device using the identity of the wearable device.

9. The mobile communications network entity according to claim 8, wherein the mobile communications network entity is adapted to store the identity of the wearable device, the identity of the wearable device being linked to the identity of the user equipment device.

10. The mobile communications network entity according to claim 8, wherein the mobile communications network entity is adapted to perform a detachment operation to detach the wearable device from the mobile communications network while maintaining the attachment of the user equipment device to the mobile communications network.

11. A user equipment device adapted to:
form a connection to a wearable device; and
attach the wearable device to a mobile communications network by means of a single attachment request from the user equipment device for attaching both the user equipment device and the wearable device to the mobile communications network, wherein the single attachment request comprises an identity of the user equipment device and an identity of the wearable device, and wherein the wearable device and the user equipment device are authenticated within a mobile management entity of the mobile communications network with a dedicated challenge response mechanism against (i) a subscriber identity module of the user equipment device using the identity of the user equipment device, and (ii) a subscriber identity module of the wearable device using the identity of the wearable device.

* * * * *